(12) United States Patent
Sung

(10) Patent No.: US 6,237,798 B1
(45) Date of Patent: May 29, 2001

(54) FUEL FILLER CAP

(75) Inventor: Yeoun-Kwan Sung, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/470,962

(22) Filed: Dec. 22, 1999

(51) Int. Cl.[7] ................................................. B65D 55/00
(52) U.S. Cl. ............................... 220/375; 220/DIG. 33
(58) Field of Search ......................... 220/375, 89.1, 220/DIG. 33

(56) References Cited

U.S. PATENT DOCUMENTS

| | | | | |
|---|---|---|---|---|
| 4,705,190 | * | 11/1987 | Mizusawa | 220/375 |
| 4,776,486 | * | 10/1988 | Mizusawa | 220/375 |
| 5,588,853 | * | 12/1996 | Anthony | 520/375 X |
| 5,720,409 | * | 2/1998 | Asakura et al. | 220/375 |
| 5,732,841 | * | 3/1998 | Jocic et al. | 220/DIG. 33 X |

* cited by examiner

Primary Examiner—Steven M. Pollard
(74) Attorney, Agent, or Firm—Christie, Parker & Hale, LLP

(57) ABSTRACT

A fuel filler cap for preventing loss thereof when fuel is filled into a fuel tank of a vehicle, the cap having a threaded stopper for being inserted at a tip end of a pouring pipe for tight sealing, a handle unit provided for rotating the threaded stopper and a lid unit extended from the handle unit for encompassing a periphery of the pouring pipe in a state where the threaded stopper is inserted into the pouring pipe, the cap comprising: a rotating unit rotatively mounted at a periphery of the lid unit; and a connecting string fixed at one end thereof to the rotating unit and fixed to a body panel in the fuel door.

5 Claims, 4 Drawing Sheets

FUEL FILLER CAP

BACKGROUND OF THE INVENTION

1. Field of the Invention

The present invention relates to a fuel filler cap adapted to open and close a pouring pipe for guiding fuel poured into a fuel tank.

2. Description of the Prior Art

A fuel tank of a vehicle is mounted with a tank body 20, a pouring pipe 21, a fuel gauge center unit 22 and the like, as illustrated in FIG. 4.

The pouring pipe 21 for guiding the flow of the fuel is equipped at a tip end thereof with a fuel filler cap 23.

In order to pour fuel into the fuel tank 20, a fuel tank door (not shown) formed at a side panel of a rear part of the vehicle is opened, the fuel filler cap 23 is rotated to be separated from the pouring pipe 21.

When the fuel filler cap 23 is separated, a fuel nozzle is inserted into the pouring pipe 21 for fuelling, and when the fuelling is finished, the fuel nozzle is taken out, the fuel filler cap 23 is mounted on the pouring pipe 21 and the fuel tank door is closed thereafter.

However, there is a problem in that, the fuel filler cap 23, after removed from the pouring pipe 21 for fuelling, is being held by a fuel operator or left on a trunk lid of a vehicle due to inconvenience during fuelling, such that, when a proper attention is not given to the fuel filler cap 23, the pouring pipe 21 is not closed by the fuel filler cap 23 and closed only by fuel door, resulting in frequent loss of the fuel filler cap 23.

There is another problem in that, if the pouring pipe 21 is not closed by the fuel filler cap 23, evaporated fuel gas is discharged from fuel in the fuel tank through the pouring pipe 21, causing atmospheric contamination, which is also against the laws.

SUMMARY OF THE INVENTION

The present invention is disclosed to solve the aforementioned problems and it is an object of the present invention to provide a fuel filler cap adapted to prevent loss thereof during fuelling.

In accordance with the object of the present invention, there is provided a fuel filler cap, the cap having a threaded stopper for being inserted at a tip end of a pouring pipe for tight sealing, a handle unit provided for rotating the threaded stopper and a lid unit extended from the handle unit for encompassing a periphery of the pouring pipe in a state where the threaded stopper is inserted into the pouring pipe, the cap comprising:

a rotating unit rotatively mounted at a periphery of the lid unit; and a connecting string fixed at one end thereof to the rotating unit and fixed to a body panel in the fuel door.

The rotating unit is ratably meshed into a guide rail unit formed at the periphery of the lid unit.

The rotating unit is bent at an upper end thereof in a "¬", shape to cover an upper surface of the lid unit and is bent at a lower end thereof in a "ᄂ" shape to encompass a lower end of the lid unit.

The lid unit is formed at a periphery thereof with a guide rail unit by way of upper and lower round protruders, and the rotating unit encompasses the lower end of the lid unit in a "U" shape, where a support horizontally bent from a tip end of U-shaped body is accommodated into the guide rail unit to be supported by the lower protruder.

Furthermore, the upper protruder is farther extended in length than the lower protruder to encompass an upper part of the support.

According to the present invention, the rotating unit surface-contacts the lid unit in a broad surface, such that the fuel filler cap is not tilted or swayed during fuelling to thereby provide a stability and the connecting string does not stand in the way to thereby provide a convenience in mounting and demounting the fuel filler cap, and there is no problem of loss thereof.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiments of the present invention will now be described in detail with reference to the accompanying drawings.

Figure 1:
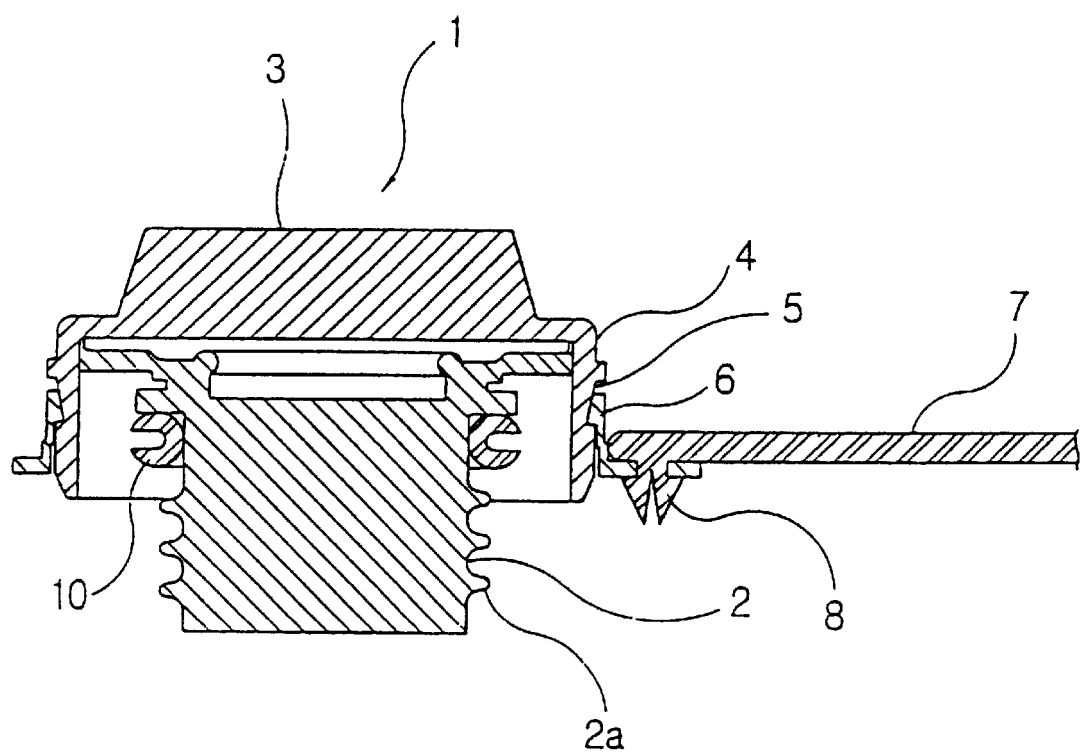
FIG. 1 is a sectional view for illustrating a first embodiment of the present invention.
Figure 2:
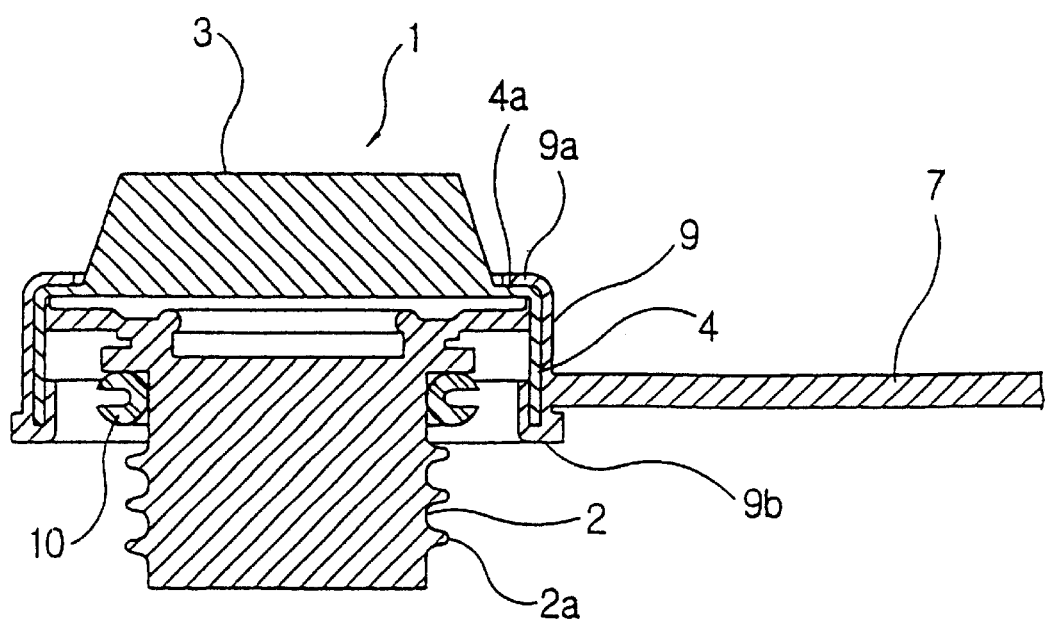
FIG. 2 is a sectional view for illustrating a revised embodiment of a fuel filler cap according to the present invention.

FIG. 1 is a sectional view for illustrating a first embodiment of the fuel filler cap according to the present invention and FIG. 2 is a sectional view for illustrating a revised embodiment of the fuel filler cap according to the present invention, where the fuel filler cap 1 includes a threaded stopper 2 having screw threads 2*a*, a handle unit 3 and a lid unit 4.

Figure 4:
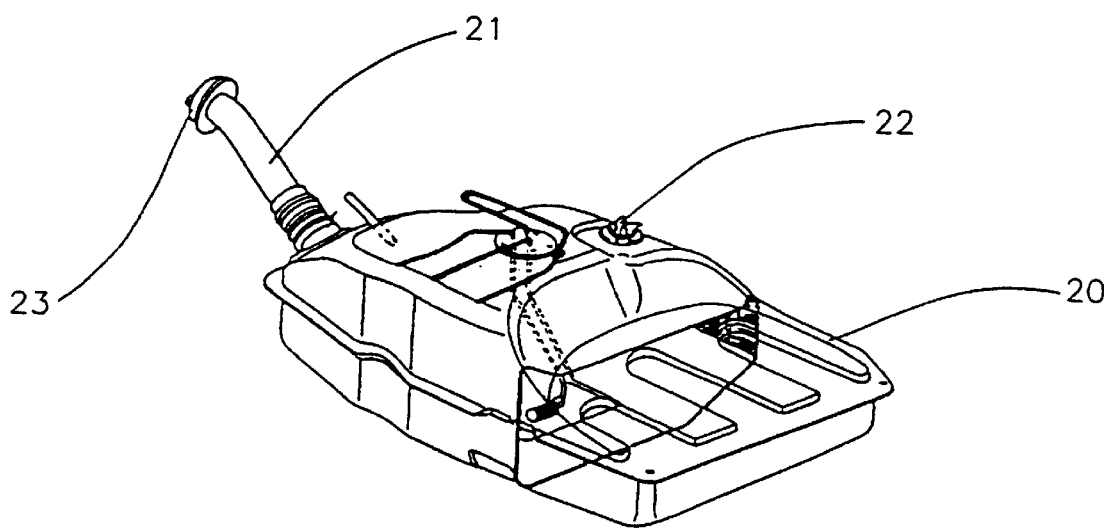
FIG. 4 is a schematic view of a fuel filler cap according to the prior art.

The threaded stopper 2 is mounted to a pouring pipe (reference numeral 21 in FIG. 4) through the screw threads 2*a* and the handle unit 3 is integrally formed with the threaded stopper 2. The lid unit 4 is formed in "ᄂ" shape between the handle unit 3 and the threaded stopper 2, between which a tip end of the pouring pipe 21 is accommodated to thereby encompass a peripheral area of the pouring pipe 21.

The lid unit 4 is equipped at a periphery thereof with a guide rail unit 5 formed with a ring-shaped groove and the guide rail unit 5 is meshed into a rotating unit 6, such that the rotating unit 6 is rotated by the guide of the guide rail unit 5. When the rotating unit 6 is fixed, the lid unit 4 is rotated.

The rotating unit 6 is connected by one end of connecting string 7 by way of fitting protruder 8 and the other end of the connecting string 7 is fixed by way of same structure as the fitting protruder 7 to a body panel (not shown) in a fuel door.

The rotating unit 9 in FIG. 2 is bent, having a cross-sectional shape like a "¬", form at its upper end 9*a* to encompass an upper surface 4*a* of the lid unit 4, and a lower end thereof 9*b* is formed in a "ᄂ" shape to encompass a lower end of the lid unit 4.

At this location, unexplained reference numeral 10 is a packing for sealing the pouring pipe for preventing leakage of the evaporative fuel gas.

When the handle unit 3 protruded in a "—" shape is held and rotated by and, the fuel filler cap 1 is separated from the pouring pipe 21, and the lid unit is also rotated along with the handle unit 3 and threaded stopper 2, there is no problem of the connecting string 7 fixed to the rotating unit 6 is tangled or of interfering in rotation.

Particularly, the lid unit 4 and rotating units 6 and 9 are surface-contacted in cylindrical shape, such that contacted surface is large enough to prevent swaying or rocking, thereby providing a good rotating stability and manipulation.

Figure 3:
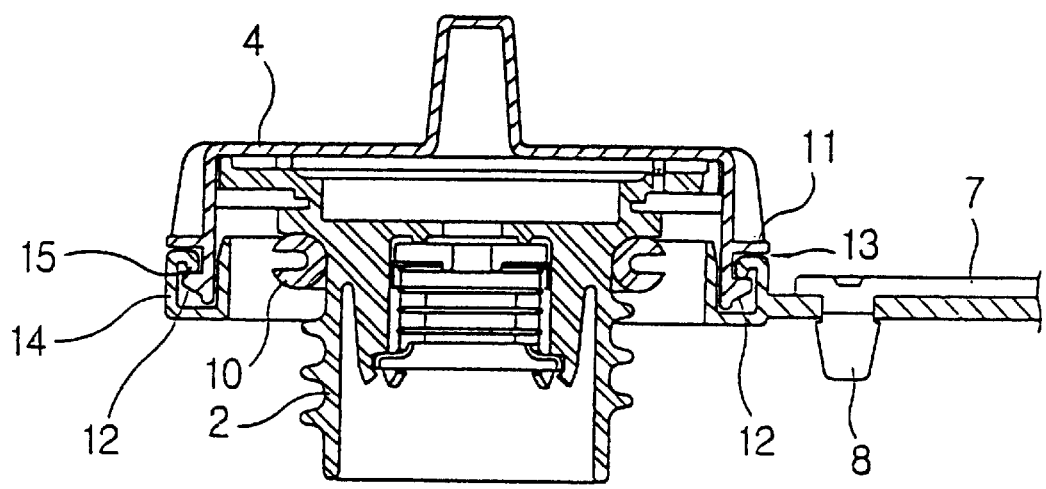
FIG. 3 is a schematic view for illustrating a second embodiment of the present invention.

FIG. 3 is a second embodiment of the present invention, where the lid unit 4 is protrusively provided at an upper part thereof with a straight handle unit 3 and at a periphery of lower end at the lid unit 4, there is arranged with a horizontal cylindrical guide rail groove 13 formed in a "ㄷ" shape by ring-shaped upper and lower protruders 11 and 12.

The upper protruder 11 is farther extended to the outside than the lower protruder 12 and the guide rail groove 13 is inserted by a support 15 of the rotating unit 14, whereby, the support 15 is supported by the lower protruder 12.

Accordingly, the rotating unit 14 has a shape encompassing inside and outside in order for the lid unit 4 to form in a "U" shape at a lower end thereof, and the supper 15 is horizontally and extensively bent from a tip end of "U" shaped body. The rotating unit 14 maintains a surface-contact with the lid unit 4 and entire periphery to thereby increase stability in rotation. Furthermore, the upper protruder 11 encompasses an upper part of the support 15 to prevent foreign objects from coming thereinto. The rotating unit 14 is coupled by the fitting protruder 8 of the connecting string 7 while the other end of the string 7 is fixed to the body panel.

Undescribed reference numeral 2 is a stopper and 10 is a packing.

As apparent from the foregoing, there is an advantage in the fuel filler cap thus constructed according to the present invention in that a rotating unit rotably meshed into a periphery of a lid unit at the fuel filler cap and a connecting string connected to hold the rotating unit to a body panel enable the lid unit to smoothly rotate relative to the rotating unit when a handle unit is rotated, and a large cylindrical surface-contact between the lid unit and the rotating unit provides a easy rotating manipulation and a stability.

There is another advantage in that a connecting string does not stand in the way in rotation, such that, even though the fuel filler cap is removed from the pouring pipe, the fuel filler cap is not lost due to its attachment to the connecting string, thereby preventing leakage of evaporative fuel gas caused by possible loss of the fuel filler cap.

What is claimed is:

1. A fuel filler cap having a threaded stopper for being inserted at an end of a pouring pipe for tight sealing, a handle unit provided for rotating the threaded stopper and a lid unit extended from the handle unit for encompassing a periphery of the pouring pipe in a state where the threaded stopper is inserted into the pouring pipe, the cap comprising:

a rotating unit rotatively mounted at a periphery of the lid unit, wherein the rotating unit is bent at an upper end thereof in a "ㄱ", shape to cover an upper surface of the lid unit and is bent at a lower end thereof in a "ㄷ" shape to encompass a lower end of the lid unit; and a connecting string fixed at one end thereof to the rotating unit and fixed to a body panel in the fuel door.

2. The cap as defined in claim 1, wherein the rotating unit is rotably meshed into a guide rail unit formed at the periphery of the lid unit.

3. A fuel filler cap having a threaded stopper for being inserted at an end of a pouring pipe for tight sealing, a handle unit provided for rotating the threaded stopper and a lid unit extended from the handle unit for encompassing a periphery of the pouring pipe in a state where the threaded stopper is inserted into the pouring pipe, the cap comprising:

a rotating unit rotatively mounted at a periphery of the lid unit, wherein the lid unit is formed at a periphery thereof with a guide rail unit by way of upper and lower round protruders, and the rotating unit encompasses the lower end of the lid unit in a "U" shape, where a support horizontally bent from a tip end of a U-shaped body is accommodated into the guide rail unit to be supported by the lower protruder; and a connecting string fixed at one end thereof to the rotating unit and fixed to a body panel in the fuel door.

4. The cap as defined in claim 3, wherein the upper and protruder is farther extended in length than the lower protruder to encompass an upper part of the support.

5. The fuel filler cap of claim 3, wherein the rotating unit is rotatably meshed into a guide rail unit formed at the periphery of the lid unit.

* * * * *